July 25, 1972  R. C. ANDLER ET AL  3,679,518
HEATER CONTROL APPARATUS FOR PACKAGING MACHINERY
Filed Feb. 1, 1971
2 Sheets-Sheet 1
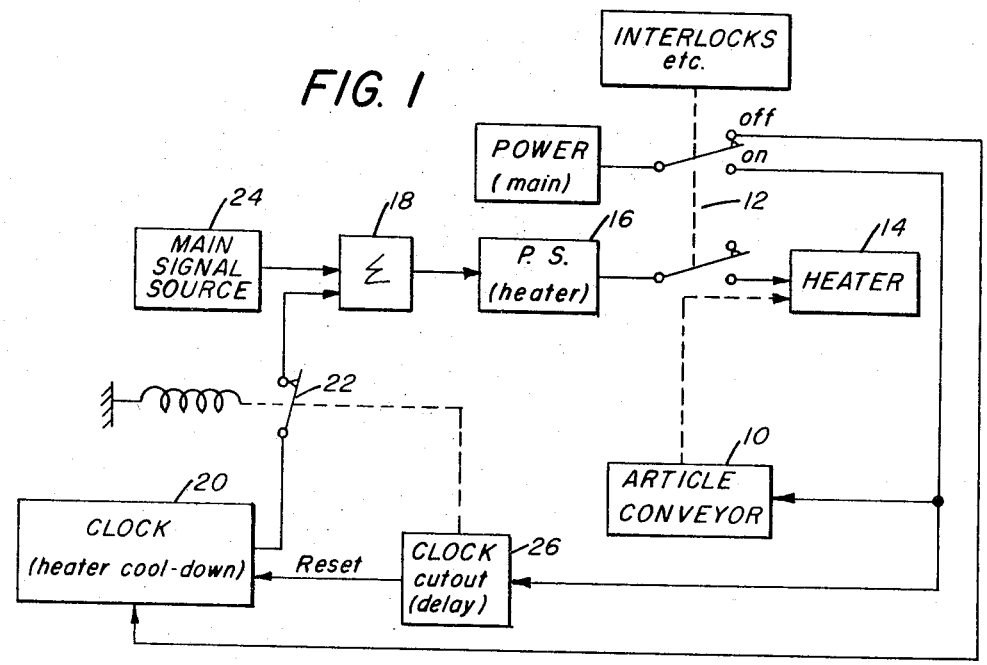
FIG. 1
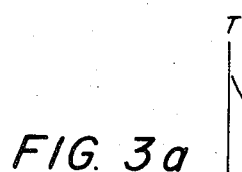
FIG. 3a
FIG. 3b
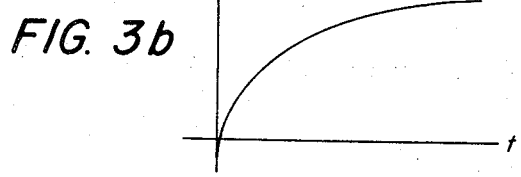
RICHARD C. ANDLER
HARLEY B. KECK
INVENTORS
BY Robert F. Cody
ATTORNEY

RICHARD C. ANDLER
HARLEY B. KECK
INVENTORS

BY Robert T. Cody

ATTORNEY

United States Patent Office 3,679,518
Patented July 25, 1972

---

3,679,518
HEATER CONTROL APPARATUS FOR PACKAGING MACHINERY
Richard C. Andler, Rochester, N.Y., and Harley B. Keck, Greeley, Colo., assignors to Eastman Kodak Company, Rochester, N.Y.
Filed Feb. 1, 1971, Ser. No. 111,510
Int. Cl. G05d 23/19; H05b 1/02
U.S. Cl. 156—351                           8 Claims

ABSTRACT OF THE DISCLOSURE

A heater control circuit for use in packaging thermoplastically wrapped articles is disclosed. The circuit computes the time that electrical power is removed from a packaging machine heater; and when power is re-applied to such heater, the power level is set in accordance with such computed time, thereby to compensate for the cool-down of the heater. In a preferred form of the invention, the computing is by means of an exponential clock that has a time constant similar to the cool-down time constant of the heater.

BACKGROUND OF THE INVENTION

Field of the invention

This invention relates in general to control circuits; more particularly, the invention provides a circuit for controlling the energy applied to heater apparatus useful with packaging machines.

Description relative to the prior art

A packaging machine applies heat to the thermoplastic material which is pre-wrapped around articles, thereby to heat-seal such wrappings. Whereas the heat-sealing of thermoplastic material requires that such material be elevated temperature-wise to a certain point in order to bring about effective sealing, too high a heat input into the wrapping material can cause problems: It frequently obtains that thermoplastic material is coated on the inside surface of paper wrapping material, and serves as a heat-sensitive glue for such wrapping material. To use more heat than is necessary to effect bonding of such coated paper may cause the paper to scorch; to use too little heat may prevent the desired bonding.

Various techniques have been proposed for controlling the output heat of heaters used to seal thermoplastic material: e.g., heater energy controlled as a function of the speed of a production line (U.S. Pat. No. 3,016,085); heater energy applied (U.S. Pat. No. 3,348,474) for a preselected duration, etc.

It often happens that packaging production lines are abruptly stopped for various reasons; and then started up again. To prevent, among other things, the above-mentioned problem of scorching, it is the practice to remove energy from the heater apparatus during packaging line shutdowns. As a result, the packaging line heater apparatus cools down and, attendantly, after the packaging line is started up again, several of the first articles which pass the heater apparatus are left inadequately sealed.

SUMMARY OF THE INVENTION

The invention proposes to time the duration that energy is removed from packaging machine heater apparatus and, when energy is re-applied to such heater apparatus, to re-apply such energy at a level dependent on the duration of heater cool-down, thereby to shorten the time that it takes for the heater apparatus to get back to a heat-sealing temperature, and thus assure proper sealing of the first articles which are acted upon by the heater apparatus after energy is re-applied to the heater apparatus.

Since the cool-down of the heater apparatus is exponentially related to time, the invention—in its presently preferred form—provides an exponential clock for determining the cool-down duration: and the time constant for the exponential clock is, preferably, the same as the time constant for the cool-down of the heater apparatus. Thus, the amount of energy which is re-applied to the heater apparatus after a packing machine shutdown is precisely consistent with the energy lost by the heater apparatus during a machine stoppage.

OBJECT OF THE INVENTION

To improve the effectiveness of heater apparatus of the type used in connection with packaging machinery.

The invention will be described with reference to the figures, wherein:

FIG. 1 is a block diagram illustrating apparatus embodying the invention,

FIGS. 3a and 3b are diagrams useful in describing the embodiment of FIG. 2.

Figure 2:
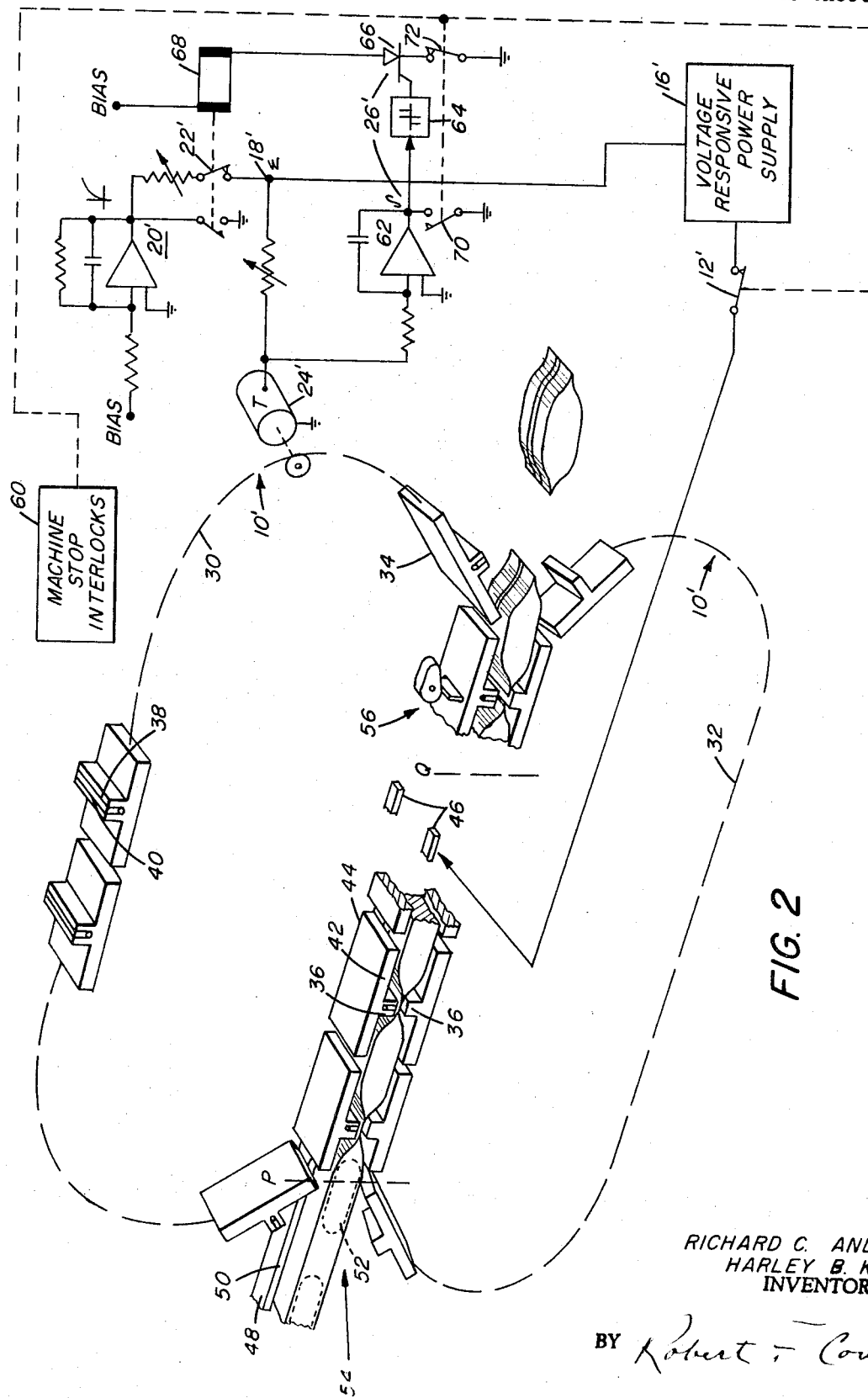
FIG. 2 is a schematic diagram illustrating apparatus according to a presently preferred form of the invention.

Referring to FIG. 1, an article conveyor 10, in response to actuation of ganged switches 12, successively conveys articles to an electric heater 14. The articles are pre-wrapped either in thermoplastic material, or in paper or the like which has been coated with thermoplastic material. Electric power is applied to the heater 14 by a power supply 16; and the power output of the power supply is dependent on a control signal which is applied to the power supply 16 by a signal summing element 18. Signal responsive power supplies are well-known in the art; and, the Vectrol Silicontrol SCR Gate Driver Sprague No. VS6431–AF–115–1, manufactured by Sprague Electric Company of Stamford, Connecticut, has been found useful for practicing the invention.

It frequently happens that the operation of the conveyor 10 is interrupted either intentionally, or inadvertently, by interlock devices, causing power to be removed from the heater 14. In accordance with the invention, as soon as power is removed from the heater 14, a clock 20 is actuated, thereby to time the cool-down duration of the heater 14. The clock 20 produces a signal which is related to the time that the switches 12 are in their OFF positions, and applies such signal, via a switch 22, to the summing element 18. The summing element 18, aside from receiving the clock signal, also receives a signal from a source 24. The signal source 24 produces a signal which is alone of sufficient strength to assure that adequate power is applied to the heater 14 for heat-sealing of article wrappings once the matter of heater cool-down has been taken care of.

A clock cut-out device 26, operable in response to the application of power to the article conveyor 10, is adapted to reset the clock 20 and remove the time-signal output of the clock 20 from the summing element 18 a brief time after the conveyor 10 has been actuated, i.e., after the heater 14 has assuredly been allowed to reach a heat-sealing temperature.

The invention operates to change the temperature rise time for a heater which has been allowed to cool, and such change in rise time depends on the duration of cool-down for the heater. Thus, after a momentary interruption of conveyor operation—where the heater 14 has barely cooled—practically no time signal is added to the signal from the source 24 to control the heater power; where, however, the interruption is for a relatively long duration, permitting the heater 14 to cool appreciably, the power-controlling signal output of the summing element 18 is appreciable thereby causing the temperature rise time for the heater 14 to shorten so that the first articles which are conveyed past the heater 14, after the conveyor 10 has been re-started, will be adequately sealed.

Reference should now be had to the embodiment of the invention depicted in FIG. 2; Character notations, save for primes, for the corresponding parts of FIGS. 1 and 2 are the same.

A packaging line for which the invention is especially useful comprises a pair of conveyor chains 30, 32, each of which is formed with hinged package-forming conveyor elements 34. The conveyor elements 34 are T-shaped, and the chains 30, 32 are disposed to mesh with the uprights 36 of oppossing T-shaped elements pressing against each other. Although each conveyor element 34 of the chain 30 is provided with a pair of (nichrome) heater wires 38, 40, the chain 32 conveyor elements may be dummies. The heater wires 38, 40 are electrically connected to contact plates 42, 44 to which power (16') is applied by means of brushes 46; and the brushes 46, which simultaneously contact several conveyor elements 34, run between points P, Q.

A partially formed package input 48, sealed at 50 and containing articles 52, is fed into the jaws 54 of the meshing conveyor elements 34, whereby discrete package units get shaped into form. The package material is paper that has been precoated with polyethylene, the pre-coat being to the inside of each package unit. Therefore, when power is applied to each pair of heater wires 38, 40, parallel heat seals are formed, in pairs, isolating the articles 52 in the individual package units from each other by use of a chopper 56, only one of which has been indicated in FIG. 2.

Since the package wrapping material is polyethylene-coated paper, care must be taken during the heat-sealing operation to raise the temperature of the polyethylene to a temperature which will allow the polyethylene to melt, without scorching the paper outside of each package unit. To this end, the invention provides a tachometer 24', driven by means of the conveyor 10', as a main signal source for controlling the operation of a voltage responsive power supply 16'. The power supply 16' applies power, via the brushes 46, to the heater wires 38, 40 in proportion to the speed of the conveyor 10': Where the conveyor speed is low, allowing a long time for package sealing purposes, the tachometer signal, and therefore the applied power, is low to prevent scorching; where the conveyor speed is high, the applied power is high so that polyethylene will quickly get to its melt temperature.

In the event the conveyor 10' is stopped, interlocks 60—cooperative with the conveyor 10'—actuate a switch 12', thereby to remove power from the heater wires 38, 40, and to start a cool-down clock running. Since the cool-down of the heater wires 38, 40 is exponentially dependent upon the duration that power is removed from the heater wires 38, 40, the invention in its presently preferred form provides, as the cool-down clock, an exponential voltage generator 20' that becomes operative as soon as power is removed from the heater wires. The output of the generator 20' is applied, via one of a pair of ganged switches 22', to a summing point 18', where it is summed with the output of the tachometer 24'. Thus, at the instant the conveyor 10' is again started up, the power which is applied to the heater wires 38, 40 is quite related to what is actually necessary for proper package sealing: and to optimize the relationship between the heater cool-down and the exponential clock voltage, the invention further proposes that the exponential voltage generator 20' have a time constant that corresponds to the cool-down time constant of the heater wires 38, 40. See FIGS. 3a, 3b, which indicate that after the conveyor 10' stops, the heater temperature T drops at the same exponential rate that the clock voltage exponentially increases.

As noted above, the tachometer 24' control signal is sufficient to control the application of power to the heater wires 38, 40 after the packaging line has been given a chance to reach a quiescent or steady state running condition. Therefore, to prevent package overheating during such normal running, apparatus according to the invention cuts-out (26') the exponential clock signal. Such signal cutout is effected by use of an integrator 62 which receives and integrates the tachometer signal, whereby as soon as the integrated tachometer signal exceeds, say, a "one reovlution" threshold (threshold circuit 64), a control rectifier 66 is fired to actuate a relay 68 and operate the ganged switches 22', thereby respectively to eliminate control of the power supply 16' by the exponential voltage generator 20', and to reset the clock voltage to zero. Switches 70 and 72, which are ganged with the interlock switch 12', are respectively for the purpose of assuring that integration starts from the instant that the conveyor 10' is restarted, and for disarming the relay 68 during the time that the exponenial clock 20' is running.

The invention has been described in detail with particular reference to preferred embodiments thereof, but it will be understood that variations that modifications can be effected within the spirit and scope of the invention. For example, it may be preferred, rather than to abruptly remove the exponential clock signal as described above from the summing element 18', to reduce gradually such signal as the integrated tachometer signal increases.

What is claimed is:

1. In an apparatus for heating thermoplastic wrappings, said apparatus having an electric heater (14) for applying heat to said wrappings, the improvement of:
   (a) signal responsive power supply means (16),
   (b) switching means (12) for applying and removing electrical power respectively to and from said electric heater,
   (c) means (24) for producing a main control signal,
   (d) means (20) for producing an auxiliary signal proportional to the time that power is removed from said heater,
   (e) means (18) for summing said control signal and said auxiliary signal to produce a sum signal, and
   (f) means (26) cooperative with said switching means for applying said sum signal to said power supply means for a brief time after power is first applied to said heater and for applying said main control signal thereafter to said power supply means.

2. The apparatus of claim 1 wherein said means for producing an auxiliary signal is a circuit that produces a signal output that exponentially increases with time.

3. The apparatus of claim 2 wherein the time constant of said circuit is approximately the same as the cool-down time constant of said heater.

4. A packaging system having:
   (a) conveyor means (10') for advancing thermoplastically wrapped articles,
   (b) heater means (38, 40) for heating said wrapped articles when said articles pass a reference location (P, Q),
   (c) means for starting and stopping said conveyor means (60),
   (d) signal responsive power supply means (16'),
   (e) means (12') for applying the output of said power supply means to said heater means when said conveyor means is operative, and for substantially removing the output of said power supply means from said heater means when said conveyor means is inoperative,
   (f) means (24') for producing a main control signal,
   (g) means (20') cooperative with said means for starting and stopping said conveyor means for producing a signal proportional to the time that the said conveyor means is stopped, and
   (h) means (18', 22') for applying both said main control signal and said time signal to said power supply means at each conveyor means startup and for applying said main control signal to said power supply after the said conveyor means has reached a quiescent operating condition.

5. The apparatus of claim 4 wherein said means for producing a main control signal is a tachometer driven by means of said conveyor means.

6. The apparatus of claim 4 wherein said means for producing a time proportional signal is a circuit that produces a voltage that increases exponentially with time.

7. The apparatus of claim 6 wherein the time constant of said circuit is approximately the same as the cool-down time constant of the said heater.

8. The apparatus of claim 4 wherein:
(a) said means for producing a main control signal is a tachometer driven by means of said conveyor means,
(b) said means for producing a time proportional signal is a circuit that produces a voltage that increases exponentially with time, and
(c) the time constant of said circuit is approximately the same as the cool-down time constant of the said heater.

References Cited
UNITED STATES PATENTS

| | | | |
|---|---|---|---|
| 2,617,007 | 11/1952 | Atkins | 219—503 |
| 3,016,085 | 1/1962 | Gassner | 156—359 |
| 3,040,156 | 6/1962 | McGlaughlin | 219—499 |
| 3,101,998 | 8/1963 | Mader | 156—359 X |
| 3,315,063 | 4/1967 | Ihlenfeldt | 219—498 X |
| 3,348,474 | 10/1967 | Virta et al. | 219—243 X |
| 3,367,261 | 2/1968 | Kashiwag | 219—243 X |
| 3,461,271 | 8/1969 | Reitzes | 219—243 |
| 3,479,485 | 11/1969 | Hanna et al. | 219—243 |

ROBERT F. BURNETT, Primary Examiner

J. C. GIL, Assistant Examiner

U.S. Cl. X.R.

53—52; 156—366, 367; 219—243, 388, 482, 492, 497